US010121233B2

(12) United States Patent
Mahmood et al.

(10) Patent No.: US 10,121,233 B2
(45) Date of Patent: Nov. 6, 2018

(54) 2D DISCRETE FOURIER TRANSFORM WITH SIMULTANEOUS EDGE ARTIFACT REMOVAL FOR REAL-TIME APPLICATIONS

(71) Applicant: OKINAWA INSTITUTE OF SCIENCE AND TECHNOLOGY SCHOOL CORPORATION, Okinawa (JP)

(72) Inventors: Faisal Mahmood, Baltimore, MD (US); Märt Toots, Tallinn (EE); Lars-Göran Wallentin Öfverstedt, Okinawa (JP); Bo Ulf Skoglund, Okinawa (JP)

(73) Assignee: OKINAWA INSTITUTE OF SCIENCE AND TECHNOLOGY SCHOOL CORPORATION, Okinawa (JP)

( * ) Notice: Subject to any disclaimer, the term of this patent is extended or adjusted under 35 U.S.C. 154(b) by 0 days.

(21) Appl. No.: 15/746,407

(22) PCT Filed: Jul. 20, 2016

(86) PCT No.: PCT/JP2016/003401
§ 371 (c)(1),
(2) Date: Jan. 19, 2018

(87) PCT Pub. No.: WO2017/013877
PCT Pub. Date: Jan. 26, 2017

(65) Prior Publication Data
US 2018/0204313 A1 Jul. 19, 2018

Related U.S. Application Data

(60) Provisional application No. 62/194,689, filed on Jul. 20, 2015.

(51) Int. Cl.
*G06K 9/38* (2006.01)
*G06T 5/10* (2006.01)
*G06T 5/00* (2006.01)

(52) U.S. Cl.
CPC .............. *G06T 5/10* (2013.01); *G06T 5/002* (2013.01); *G06T 2207/20056* (2013.01); *G06T 2207/20192* (2013.01)

(58) Field of Classification Search
None
See application file for complete search history.

(56) References Cited

U.S. PATENT DOCUMENTS 5,089,982 A * 2/1992 Gran .................... G06F 17/142
708/401
5,450,553 A * 9/1995 Kitagaki ............... G06F 9/3001
711/214
(Continued)

FOREIGN PATENT DOCUMENTS

| CN | 101944235 A | 1/2011 |
| CN | 102722895 A | 10/2012 |
| CN | 103379339 A | 10/2013 |

OTHER PUBLICATIONS

D'Alberto, Paolo, et al. "Generating fpga-accelerated dft libraries." Field-Programmable Custom Computing Machines, 2007. FCCM 2007. 15th Annual IEEE Symposium on. IEEE, 2007.*
(Continued)

*Primary Examiner* — Andrae S Allison
(74) *Attorney, Agent, or Firm* — Westerman, Hattori, Daniels & Adrian, LLP

(57) ABSTRACT

A method for performing 2-dimensional discrete Fourier transform of a subject image data to be performed in one or more digital processors includes performing 1-dimensional fast Fourier transform on each row of the subject image data and 1-dimensional fast Fourier transform on each column of
(Continued)

the subject image, and performing a simplified fast Fourier transform processing on the extracted boundary image without performing column-by-column 1-dimensional fast Fourier transform by: performing 1-dimensional fast Fourier transform only on a first column vector in the extracted boundary image data, using scaled column vectors to derive fast Fourier transform of remaining columns of the extracted boundary image data, and performing 1-dimensional fast Fourier transform on each row of the extracted boundary image data. Then, fast Fourier transform of a periodic component of the subject image data with edge-artifacts removed and fast Fourier transform of a smooth component of the subject image data are derived from results of steps (b) and (c).

7 Claims, 9 Drawing Sheets

(56) References Cited

U.S. PATENT DOCUMENTS

| | | | |
|---|---|---|---|
| 6,021,423 A | 2/2000 | Nag et al. | |
| 6,041,340 A | 3/2000 | Mintzer | |
| 6,418,243 B1* | 7/2002 | Skoglund | G06T 11/003 345/419 |
| 6,744,821 B1* | 6/2004 | Van Acker | H04L 25/03159 375/260 |
| 9,482,855 B2* | 11/2016 | Shibata | G06T 5/002 |
| 9,594,032 B2* | 3/2017 | Mahmood | G01N 23/046 |
| 2003/0190056 A1* | 10/2003 | Metois | G06T 9/001 382/100 |
| 2009/0123048 A1* | 5/2009 | Leroux | G06T 11/006 382/131 |
| 2013/0279607 A1* | 10/2013 | Baker | H04N 19/865 375/240.29 |
| 2015/0301985 A1* | 10/2015 | Zhang | H03M 13/158 708/403 |

OTHER PUBLICATIONS

Mahmood, Faisal, et al. "2D discrete Fourier transform with simultaneous edge artifact removal for real-time applications." Field Programmable Technology (FPT), 2015 International Conference on. IEEE, 2015.*
Cooley, James W., and John W. Tukey., "An Algorithm for the Machine Calculation of Complex Fourier Series", Mathematics of Computation, vol. 19, Issue .90 (Apr. 1965): 297-301.
Kee, H., Bhattacharyya, S. S., Petersen, N., & Komerup, J., "Resource-efficent Acceleration of 2-Dimensional Fast Fourier Transform Computations on FPGAs", Distributed Smart Cameras, 2009. ICDSC 2009. Third ACM/IEEE International Conference on. IEEE, 2009.
Wang, Endong, et al., "Intel Math Kernel Library", High-Performance Computing on the Intel Xeon Phi., Springer International Publishing, 2014, 167-188.
Frigo, Matteo, and Steven G. Johnson., "FFTW: An Adaptive Software Architecture for The FFT", Acoustics, Speech and Signal Processing, 1998, Proceedings of the 1998 IEEE International Conference on. vol. 3, 1381-1384.
Puschel, Markus, et al., "SPIRAL: Code Generation for DSP Transforms", Proceedings of the IEEE 93.2 (2005): vol. 93, No. 2, pp. 232-275.
Lenart, Thomas, Mats Gustafsson, and Viktor Owall., "A Hardware Acceleration Platform for Digital Holographic Imaging" Journal of Signal Processing Systems 52.3 (2008): 297-311.
Uzun, Isa Servan, Abbes Amira, and Ahmed Bouridane, "FPGA implementations of fast Fourier transforms for real-time signal and image processing", Vision, Image and Signal Processing, IEE Proceedings, vol. 152. No. 3. IET, Jun. 2005.
Yu, Chi-Li, et al., "Multidimensional DFT IP Generator for FPGA Platforms", Circuits and Systems I: Regular Papers, IEEE Transactions on 58.4 (Apr. 2011): 755-764.
He, Dajun, and Qibin Sun., "A Practical Print-Scan Resilient Watermarking Scheme", IEEE ICIP (1). 2005.
Bailey, Donald G., "Design for embedded image processing on FPGAs", John Wiley and Sons, 2011: 323-324.
Moisan, Lionel, "Periodic Plus Smooth Image Decomposition", Journal of Mathematical Imaging and Vision 39.2 (2011): 161-179.
Hast, Anders, "Robust and Invariant Phase Based Local Feature Matching", Pattern Recognition (ICPR), 2014, 22nd International Conference on. IEEE, 2014: 809-814.
Galerne, Bruno, Yann Gousseau, and Jean-Michel Morel., "Random Phase Textures: Theory and Synthesis", Image Processing, IEEE Transactions on 20.1 (Jan. 2011): 257-267.
Hovden, Robert, et al.,"Periodic Artifact Reduction in Fourier Transforms of Full Field Atomic Resolution Images", Microscopy and Microanalysis, 21.02 (2015): 436-441.
Kehtamavaz, Nasser, and Sidharth Mahotra., "FPGA Implementation Made Easy for Applied Digital Signal Processing Courses", Acoustics, Speech and Sig, IEEE, 2011: 2892-2895.
Elliott, Chance, et al., National instruments LabVIEW: A Programming Environment for Laboratory Automation and Measurement, Journal of the Association for Laboratory Automation, 12.1 (Feb. 2007): 17-24.
Caesar, Greg, and Mark Wetzel., "PXI Express: Extending Backplanes to 6 GBYTE/S While Maintaining Backwards Compatibility", Autotestcon, IEEE, 2005: 231-234.
National Instruments Technical Document [online], Device Specifications NI PXIe-7976R, Ni FlexRIO FPGA Module for PXI Exporess. 2014, Available: http://www.ni.com/pdf/manuals/374545a.pdf (Accessed on: Jan. 16, 2015).
Jung, Hyunuk, and Soonhoi Ha., "Hardware Synthesis from Coarse-Grained Dataflow Specification for Fast HW/SW Cosynthesis", Proceedings of the 2nd IEEE/ACM/IFIP international conference on Hardware/software codesign and system synthesis. ACM, 2004: 24-29.
Eonic PowerFFT ASIC [Online] 2008. Available: hfip://www.eonic.com/.
Kee, Hojin, et al., "Systematic generation of FPGA-based FFT implementations", Acoustics, Speech and Signal Processing, 2008., ICASSP 2008. IEEE International Conference on. IEEE, 2008: 1416-1413.
International Search Report (ISR) issued in PCT/JP2016/003401 dated Oct. 2016.
Written Opinion (PCT/ISA/237) issued in PCT/JP2016/003401 dated Oct. 2016.
Reeves, "Fast Image Restoration Without Boundary Artifacts", IEEE Transaction on Image Processing, Oct. 2005, vol. 14, No. 10, pp. 1448-1453.
Kestur, "Accelerating the Nonuniform Fast Fourier Transform using FPGAs", 18th IEEE Annual International Symposium on Field-Programmable Custom Computing Machines, 2010, pp. 19-26.
VanCourt et al., "LAMP: A Tool Suite for Families of FPGA-Based Compitational Accelerators", IEEE, 2005, pp. 612-617.
Bailey, "Image Border Management for FPGA Based Filters", Sixth IEEE International Symposium on Electronic Design, Test and Application, 2011, pp. 144-149.
Desjardians et al., "Real-Time FPGA Processing for High-Speed Optical Frequency Domain Imaging", IEEE Transactions on Medical Imaging, Sep. 2009, vol. 28, No. 9, pp. 1468-1472.
Bertero et al., "A simple method for the reduction of boundary effects in the Richardson-Lucy approach to image Deconvolution", Astronomy & Astrophysics, 2005, pp. 369-374.
Liu et al., "Reducing Boundary Artifacts in Image Deconvolution", 15th IEEE. Int. Conf. on Image Processing, 2008, pp. 505-508.
Uzun et al., "FPGA Implementations of Fast Fourier Transforms for Real-Time Signal and Image Processing", IEE Proceedings—Vision, Image and Signal Processing, Jun. 3, 2005, vol. 152, Issue: 3.
Estun et al., "Real-time processing for Fourier domain optical coherence tomography using a field programmable fate array", Review of Scientific Instruments 79, 114301 (2008).

(56) References Cited

OTHER PUBLICATIONS

Kanwar, "Real Time Edge Detection Using Sundance Video and Image Processing System", Master of Technology, National Institute of Technology (Rourkela), 2007-2009, ftp://ftp2.sundance.com/Pub/documentation/pdf-files/real-time_edge_detection.pdf.

Office Action dated Jun. 28, 2018, issued in counterpart Chinese Application No. 201680042150.6, with English translation. (10 pages).

Extended (supplementary) European Search Report dated Sep. 17, 2018, issued in counterpart application No. 16827444.7 (8 pages).

* cited by examiner

[Fig. 1]
(a)
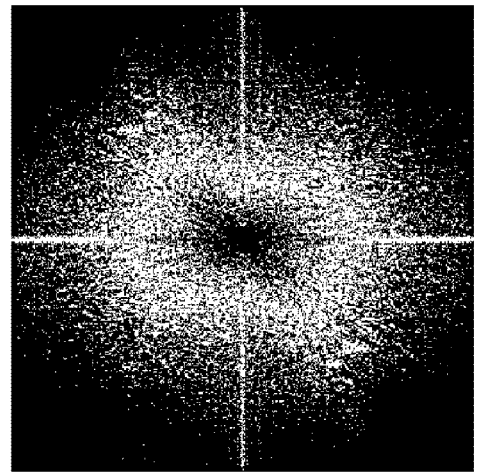
(b)
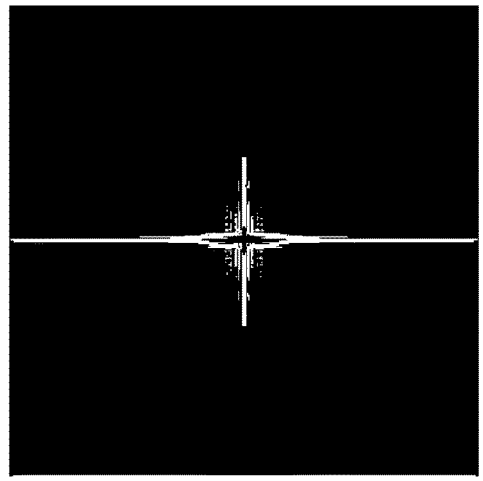
(c)
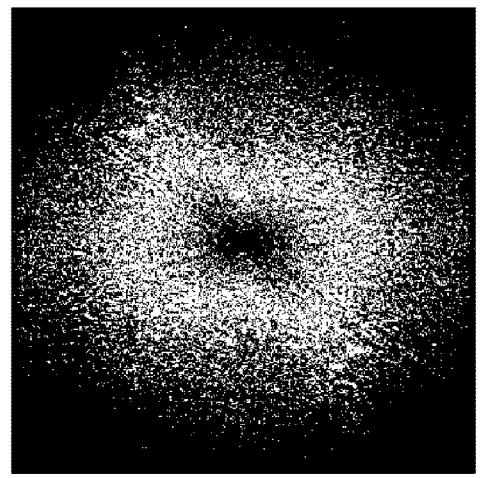
(d)
(e)
(f)

[Fig. 2]
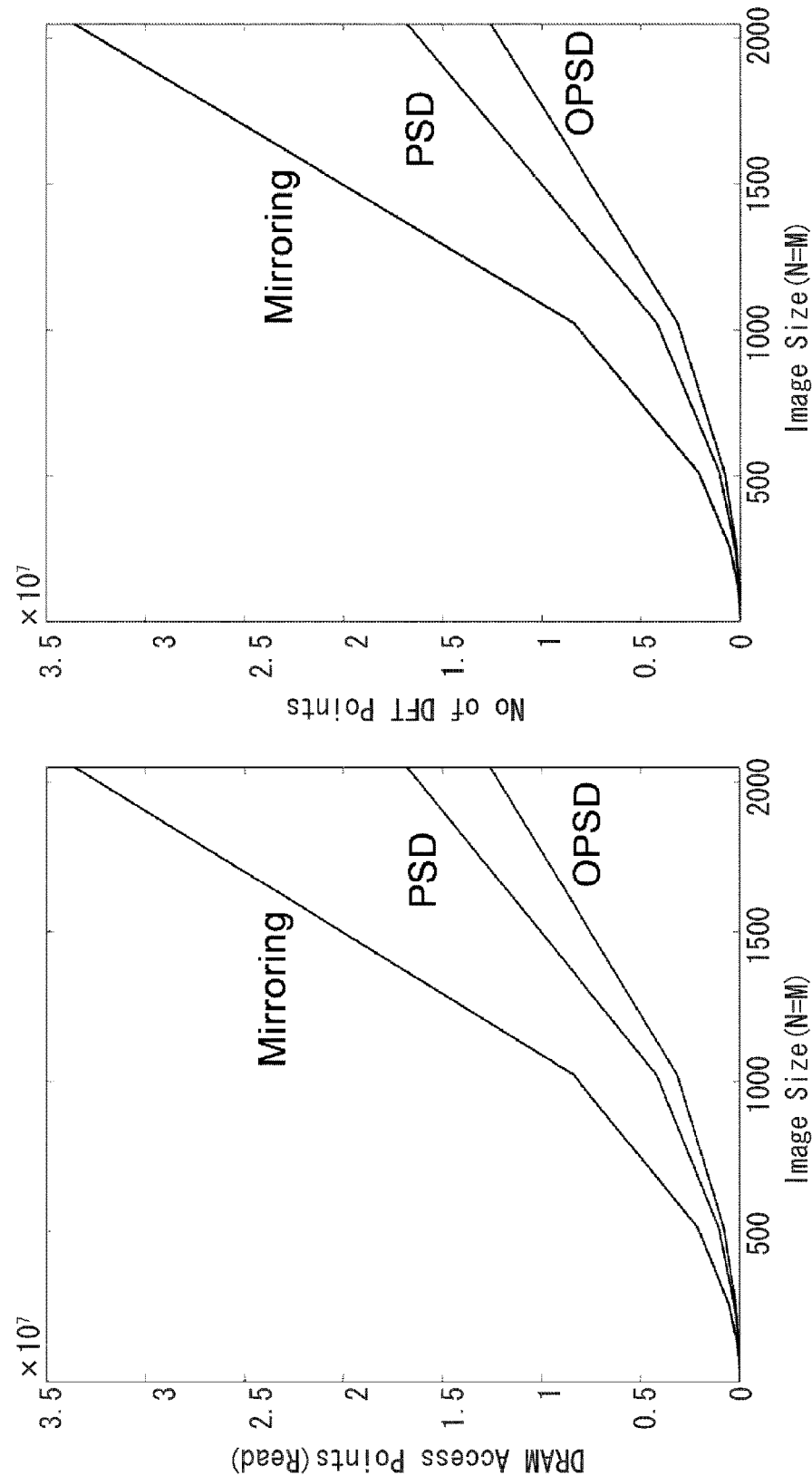

[Fig. 3]
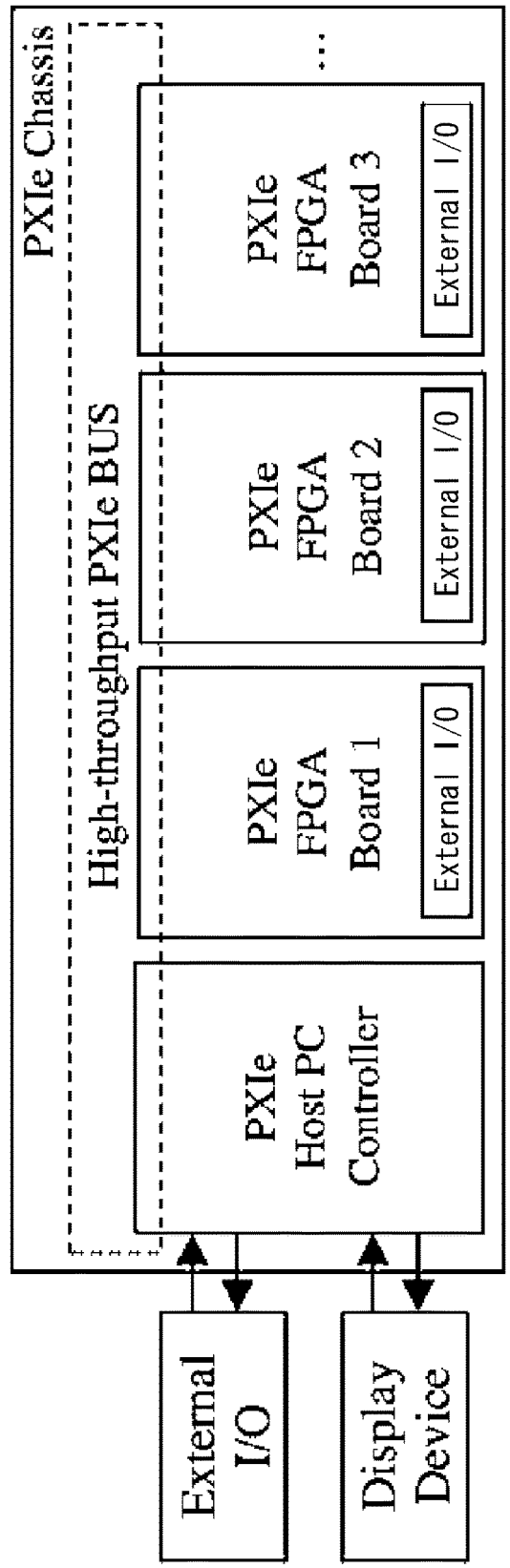

[Fig. 4]
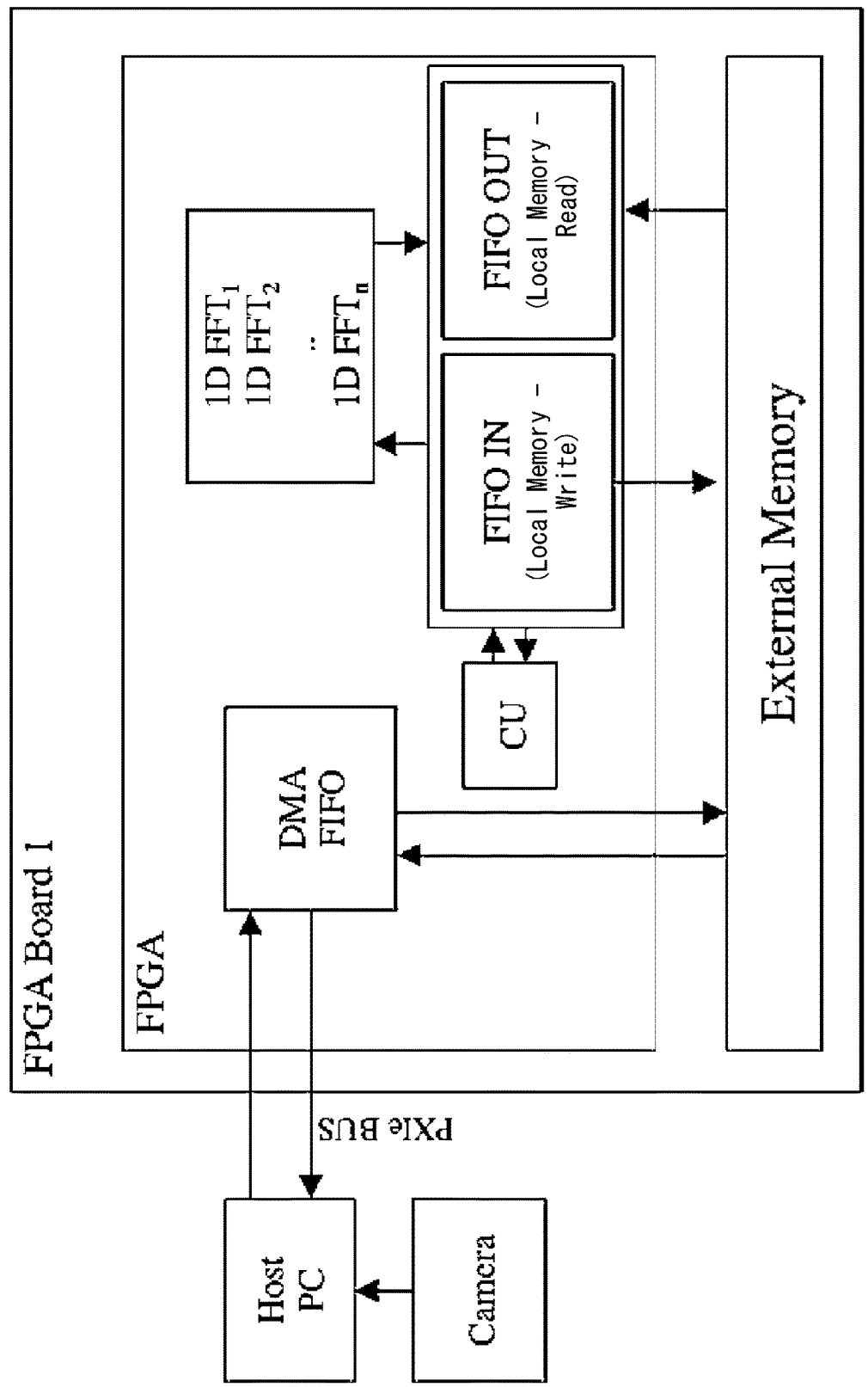

[Fig. 5]
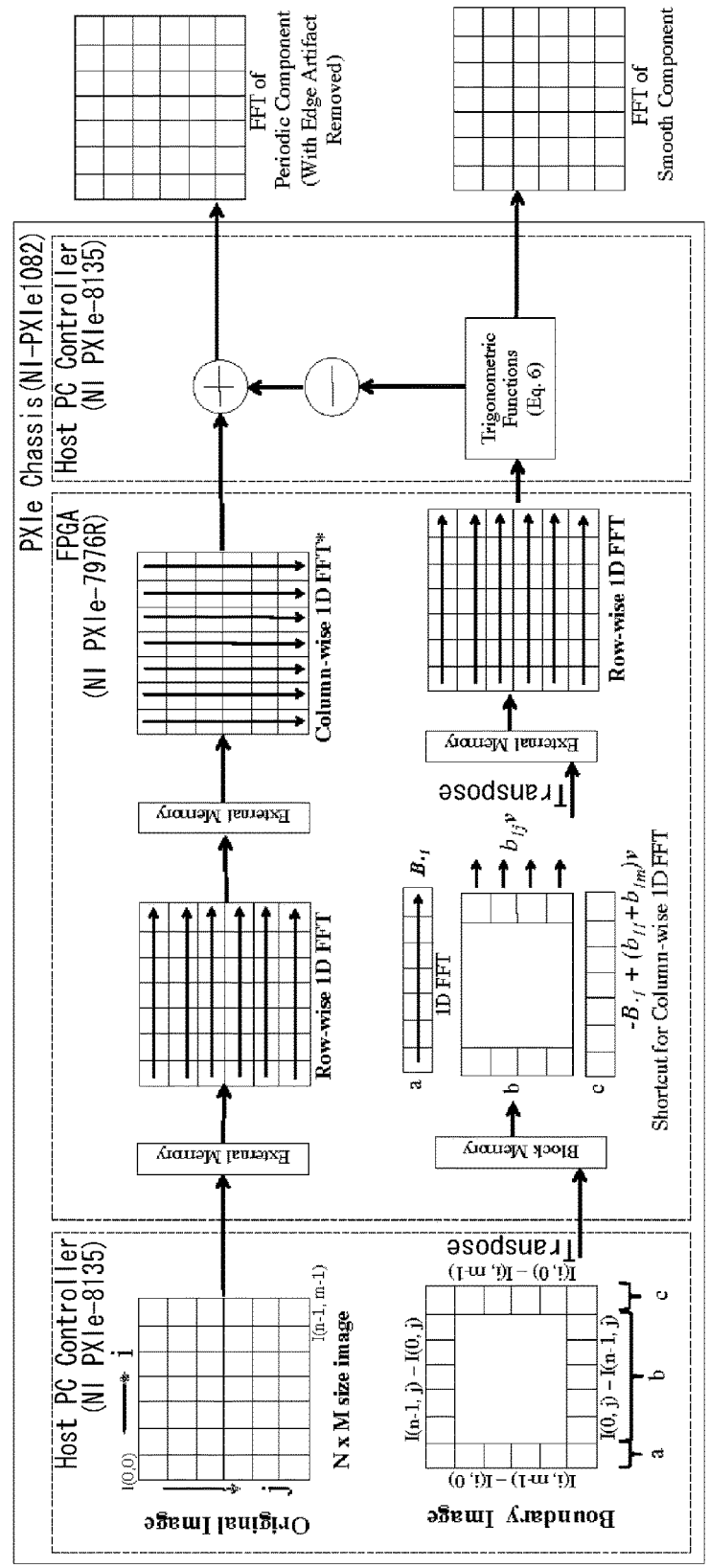

[Fig. 6]
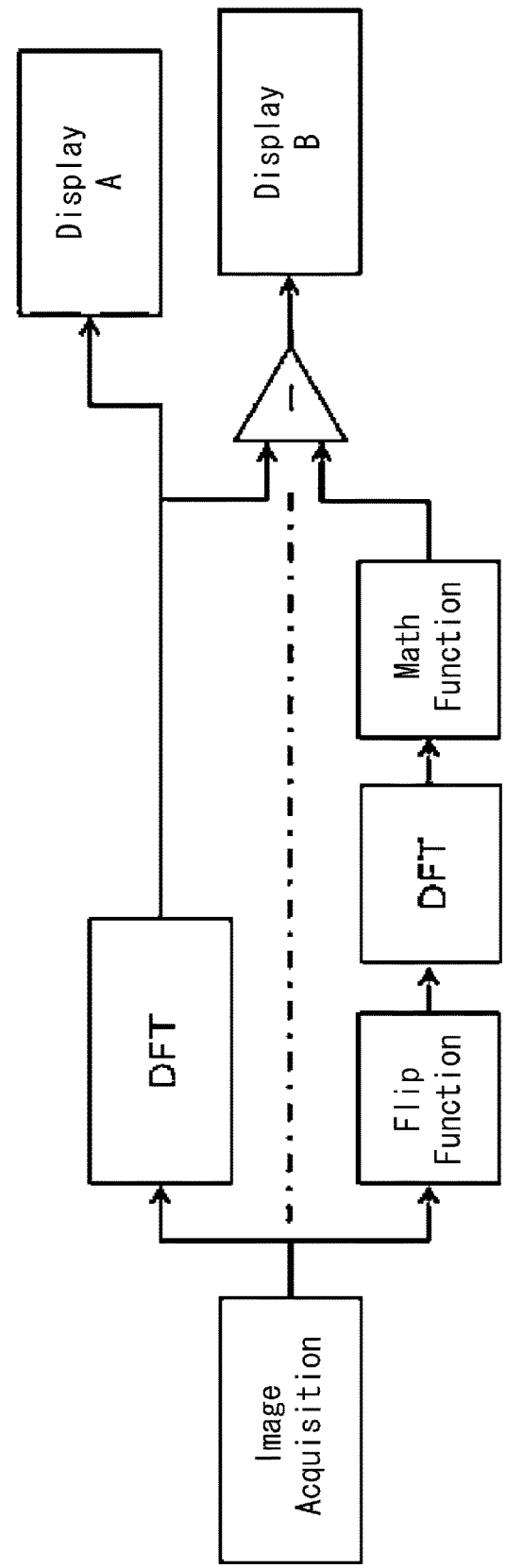

[Fig. 7]
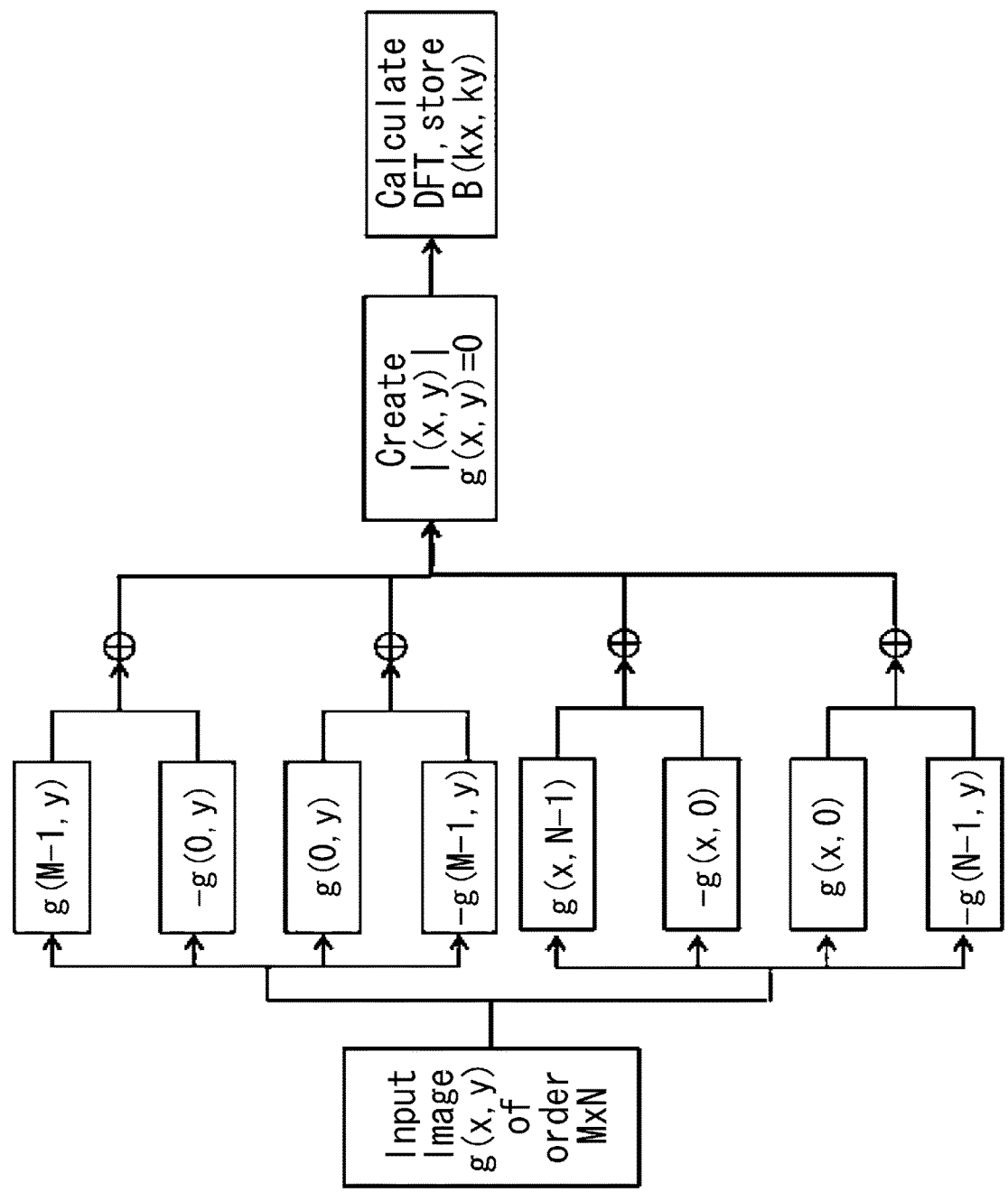

[Fig. 8]
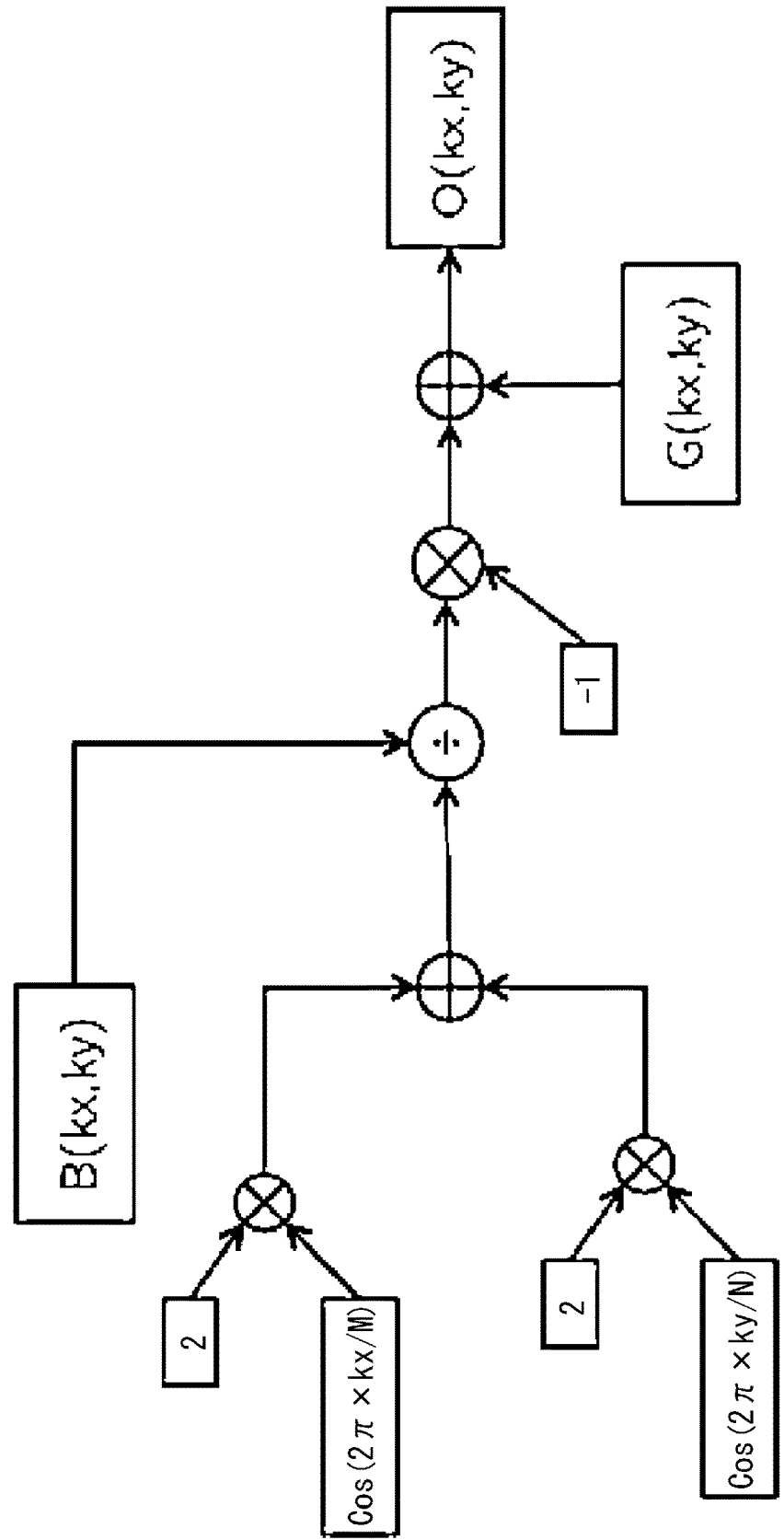

[Fig. 9]
Original Image
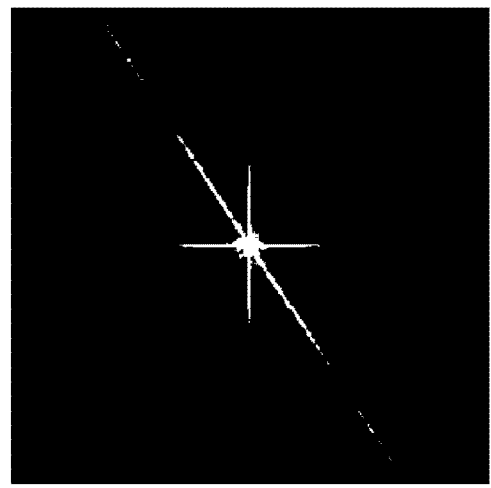
DFT
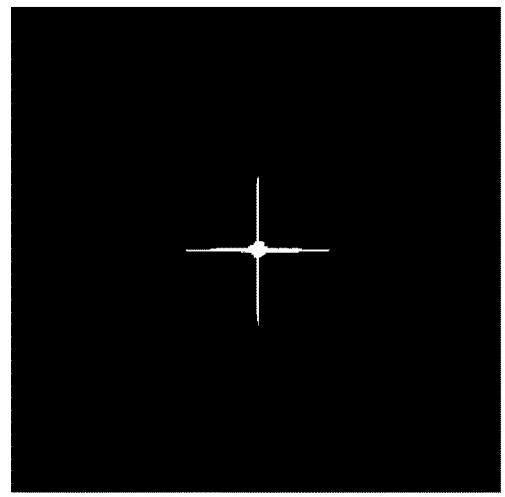
Removal Component (RC)
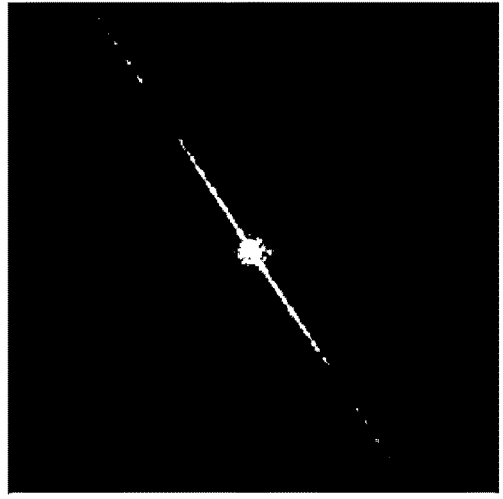
DFT-RC

2D DISCRETE FOURIER TRANSFORM WITH SIMULTANEOUS EDGE ARTIFACT REMOVAL FOR REAL-TIME APPLICATIONS

TECHNICAL FIELD

The present invention relates to method and system for configuring field programmable hardware to remove edge effects or series termination errors in 2-Dimensional Discrete Fourier transforms (2D DFTs). This application hereby incorporates by reference U.S. Provisional Application No. 62/194,689, filed Jul. 20, 2015, in its entirety.

BACKGROUND ART

Discrete Fourier Transform (DFT) is one of the most commonly used and vitally important functions with a vast variety of applications including, but not limited to digital communication systems, image processing, computer vision, biomedical imaging, and reconstruction of 3D (e.g., tomographic) densities from 2D data. Fourier image analysis simplifies computations by converting complex convolution operations in the spatial domain to simple multiplications in the frequency domain. Due to their computational complexity, DFTs often become a computational constraint for applications requiring high throughput and near real-time operations. The Cooley-Tukey Fast Fourier Transform (FFT) algorithm (NPL No. 1), first proposed in 1965, reduces the complexity of DFTs from $O(N^2)$ to $O(N \log N)$ for a 1D DFT. However, in the case of 2D DFTs, 1D FFTs have to be computed in two-dimensions, increasing the complexity to $O(N^2 \log N)$, thereby making 2D DFTs a significant bottleneck for real-time machine vision applications (NPL No. 2).

There are several resource-efficient, high-throughput implementations of 2D DFTs. Many of these implementations are software-based and have been optimized for efficient performance on general-purpose processors (GPPs), examples of which are: Intel MKL (NPL No. 3), FFTW (NPL No. 4) and Spiral (NPL No. 5). Implementations on GPPs can be readily adapted for a variety of scenarios. However, GPPs consume more power and are not ideal for real-time embedded applications. Several Application Specific Integrated Circuit (ASIC)-based implementations have also been proposed (NPL No. 6), but since it is not easy to modify ASIC implementations, they are not cost-effective solutions for rapid prototyping of image processing systems. Due to their inherent parallelism and re-configurability, Field Programmable Gate Arrays (FPGAs) are an attractive target for accelerating FFT computations, since they fully exploit the parallel nature of the FFT algorithm itself. There have been several high-throughput FPGA-based implementations over the past few years. Most of these implementations rely upon repeated invocations of 1D FFTs by row and column decomposition (RCD) with efficient use of external memory (NPL Nos. 2, 7, and 8). Many of them achieve real-time or near real-time performance (i.e., greater than or equal to 23 frames per second for a standard 512×512 image).

While calculating 2D DFTs, it is assumed that the image is periodic, which is usually not the case. This non-periodic nature of the image leads to artifacts in the Fourier transform, which are known as edge artifacts or series termination errors. These artifacts appear as several crosses of high-amplitude coefficients in the frequency domain as seen in NPL Nos. 9 and 10. Such edge artifacts can be passed to subsequent stages of processing and may lead to critical misinterpretations of results in biomedical applications. None of the current 2D FFT FPGA implementations address this problem directly. These artifacts are often removed during pre-processing, using mirroring, windowing, zero padding or post-processing, e.g., filtering techniques. These techniques are usually computationally intensive, involve an increase in the image size, and often also tend to modify the transform. The most common approach is by ramping the image at corner pixels to slowly attenuate the edges. Ramping is usually accomplished by an apodization function such as a Tukey (tapered cosine) or a Hamming window, which smoothly reduces the intensity to zero. Such an approach can be implemented on an FPGA as a pre-processing operation by storing the window function in a Look-up Table (LUT) and multiplying it with the image stream before calculating the FFT (NPL No. 10). Although this approach is not extremely computationally intensive for small images, it inadvertently removes necessary information from the image which may have serious consequences if the image is being further processed with several other images to reconstruct a final image, which is used for diagnostics or other decision critical applications. Another common method is by mirroring the image from N×N to 2N×2N. Doing so makes the image periodic, thereby removing edge artifacts. However, this not only increases the size of the image four times, but also makes the transform symmetric which generates an inaccurate phase component.

Most of the previous RCD based 2D FFT FPGA implementations have two major design challenges: 1) the 1D FFT implementation needs to have a reasonably high-throughput and be resource efficient; and 2) external DRAM needs to have a high-bandwidth and be efficiently addressed because images are usually large and intermediate storage is required between row and column 1D FFT operations.

Simultaneously removing the edge artifacts while calculating 1D, 2D or multidimensional FFT imposes an additional design challenge, regardless of the method used. However, these artifacts must be removed in applications where they may be propagated to next levels of processing.

CITATION LIST

Non Patent Literature

NPL 1: Cooley, James W., and John W. Tukey. An algorithm for the machine calculation of complex Fourier series. Mathematics of computation 19.90 (1965): 297-301.

NPL 2: Kee, H., Bhattacharyya, S. S., Petersen, N., & Kornerup, J. Resource-efficient acceleration of 2-dimensional Fast Fourier Transform computations on FPGAs. Distributed Smart Cameras, 2009. ICDSC 2009. Third ACM/IEEE International Conference on. IEEE, 2009.

NPL 3: Wang, Endong, et al. Intel Math Kernel Library. High-Performance Computing on the Intel Xeon Phi. Springer International Publishing, 2014. 167-188.

NPL 4: Frigo, Matteo, and Steven G. Johnson. FFTW: An adaptive software architecture for the FFT. Acoustics, Speech and Signal Processing, 1998. Proceedings of the 1998 IEEE International Conference on. Vol. 3. IEEE, 1998.

NPL 5: Puschel, Markus, et al. SPIRAL: Code generation for DSP transforms. Proceedings of the IEEE 93.2 (2005): 232-275.

NPL 6: Lenart, Thomas, Mats Gustafsson, and Viktor Owall. A hardware acceleration platform for digital holographic imaging. Journal of Signal Processing Systems 52.3 (2008): 297-311.

NPL 7: Uzun, Isa Servan, Abbes Amira, and Ahmed Bouridane. FPGA implementations of fast Fourier transforms for real-time signal and image processing. Vision, Image and Signal Processing, IEE Proceedings-. Vol. 152. No. 3. IET, 2005.

NPL 8: Yu, Chi-Li, et al. Multidimensional DFT IP generator for FPGA platforms. Circuits and Systems I: Regular Papers, IEEE Transactions on 58.4 (2011): 755-764.

NPL 9: He, Dajun, and Qibin Sun. A practical print-scan resilient watermarking scheme. IEEE ICIP (1). 2005.

NPL 10: Bailey, Donald G. Design for embedded image processing on FPGAs. John Wiley and Sons, 2011: 323-324.

NPL 11: Moisan, Lionel. Periodic plus smooth image decomposition. Journal of Mathematical Imaging and Vision 39.2 (2011): 161-179.

NPL 12: Hast, Anders. Robust and Invariant Phase Based Local Feature Matching. Pattern Recognition (ICPR), 2014 22nd International Conference on. IEEE, 2014.

NPL 13: Galerne, Bruno, Yann Gousseau, and Jean-Michel Morel. Random phase textures: Theory and synthesis. Image Processing, IEEE Transactions on 20.1 (2011): 257-267.

NPL 14: Hoyden, Robert, et al. Periodic Artifact Reduction in Fourier Transforms of Full Field Atomic Resolution Images. Microscopy and Microanalysis 21.02 (2015): 436-441.

NPL 15: Kehtarnavaz, Nasser, and Sidharth Mahotra. FPGA implementation made easy for applied digital signal processing courses. Acoustics, Speech and Signal Processing (ICASSP), 2011 IEEE International Conference on. IEEE, 2011.

NPL 16: Elliott, Chance, et al. National instruments LabVIEW: a programming environment for laboratory automation and measurement. Journal of the Association for Laboratory Automation 12.1 (2007): 17-24.

NPL 17: Caesar, Greg, and Mark Wetzel. PXI Express: extending backplanes to 6 Gbyte/s while maintaining backwards compatibility. Autotestcon, 2005. IEEE. IEEE, 2005.

NPL 18: National Instruments Technical Document [online], Device Specifications NI PXIe-7976R, NI FlexRIO FPGA Module for PXI Exporess. 2014, Available: http://www.ni.com/pdf/manuals/374545a.pdf (Accessed on: 16 Jan. 2015)

NPL 19: Jung, Hyunuk, and Soonhoi Ha. Hardware synthesis from coarse-grained dataflow specification for fast HW/SW cosynthesis. Proceedings of the 2nd IEEE/ACM/IFIP international conference on Hardware/software codesign and system synthesis. ACM, 2004.

NPL 20: Eonic PowerFFT ASIC [Online]. Available: http://www.eonic.com/

NPL 21: Kee, Hojin, et al. Systematic generation of FPGA-based FFT implementations. Acoustics, Speech and Signal Processing, 2008. ICASSP 2008. IEEE International Conference on. IEEE, 2008.

SUMMARY OF INVENTION

Technical Problem

As noted above, the existing techniques to remove edge artifacts require large computational resources, such as large memory usage and many invocations of 1D DFT routines, or do not provide effective and sufficient removal of the edge artifacts in a conveniently implementable manner. To date, there is no efficient and effective technique available for removing edge artifacts for 2D discrete Fourier transform for real-time applications.

An object of the present invention is to provide an efficient and effective scheme and system to remove edge artifacts in 2D discrete Fourier transform in real time.

Another object of the present invention is to provide an efficient and effective scheme to remove edge artifacts in 2D discrete Fourier transform in real time that is readily implementable in 2D FFT FPGA (Field Programmable Gate Array).

Another object of the present invention is to provide a 2D FFT system including FPGAs in which an efficient and effective scheme to remove edge artifacts in 2D discrete Fourier transform in real time is implemented.

Solution to Problem

To achieve these and other advantages and in accordance with the purpose of the present invention, as embodied and broadly described, in one aspect, the present invention provides a method for performing 2-dimensional discrete Fourier transform of a subject image data to be performed in one or more digital processors, the method including: step (a) of extracting boundary image data from the subject image data; step (b) of performing 2-dimensional fast Fourier transform of the subject image data by performing 1-dimensional fast Fourier transform on each row of the subject image data and performing 1-dimensional fast Fourier transform on each column of the subject image data; step (c) of performing a simplified 2-dimensional fast Fourier transform processing on the extracted boundary image data without performing column-by-column 1-dimensional fast Fourier transform so as to derive fast Fourier transform of a smooth component, the step (c) including: performing 1-dimensional fast Fourier transform only on a first column vector in the extracted boundary image data, using scaled column vectors to derive fast Fourier transform of remaining columns of the extracted boundary image data, and performing 1-dimensional fast Fourier transform on each row of the extracted boundary image data; and step (d) of deriving fast Fourier transform of a periodic component of the subject image data with edge-artifacts removed by subtracting the fast Fourier transform of the smooth component derived in step (c) from the 2-dimensional fast Fourier transform of the subject image data performed by step (b). In this method, steps (b) and (c) may be processed in parallel.

In this method, the one or more processors may include a host computer and one or more Field Programmable Gate Arrays (FPGAs) connected to the host computer, and steps (a) and (d) may be performed by the host computer, and steps (b) and (c) may be performed in parallel by one or more FPGAs.

In another aspect, the present invention provides a system for performing 2-dimensional discrete Fourier transform of a subject image data, including: a host computer; and one or more Field Programmable Gate Arrays (FPGAs) connected to the host computer by a bus, wherein the host computer extracts boundary image data from the subject image data, wherein said one or more FPGAs perform (i) 2-dimensional fast Fourier transform of the subject image data by performing 1-dimensional fast Fourier transform on each row of the subject image data and performing 1-dimensional fast Fourier transform on each column of the subject image data, wherein said one or more FPGAs perform (ii) a simplified 2-dimensional fast Fourier transform processing on the extracted boundary image data without performing column-by-column 1-dimensional fast Fourier transform so as to derive fast Fourier transform of a smooth component, the processing including: performing 1-dimensional fast Fourier transform only on a first column vector in the extracted boundary image data, using scaled column vectors to derive fast Fourier transform of remaining columns of the extracted boundary image data, and performing 1-dimensional fast Fourier transform on each row of the extracted boundary image data, and wherein the host computer derives fast Fourier transform of a periodic component of the subject image data with edge-artifacts removed by subtracting the derived fast Fourier transform of the smooth component from the performed 2-dimensional fast Fourier transform of the subject image data. In this system, the host computer may be configured to control the one or more FPGAs such that (i) and (ii) are processed in parallel.

In another aspect, the present invention provides a method for performing N-dimensional fast Fourier transform of an N-dimensional image data, where N is an integer greater than 2, the method including: slicing said N-dimensional image data into a plurality of 2-dimensional image data; and performing the method for performing 2-dimensional discrete Fourier transform of a subject image data as set forth above on each of said plurality of 2-dimensional image data; and deriving the N-dimensional fast Fourier transform of said N-dimensional image data from results of performing the above method on each of said plurality of 2-dimensional image data. In a similar manner, the above-described system may be configured such that the host computer receives an N-dimensional image data, where N is an integer greater than 2, and slices said received N-dimensional image data into a plurality of 2-dimensional image data; said one or more FPGAs performs (i) and (ii) on each of said plurality of 2-dimensional image data; and the host computer derives N-dimensional Fourier transform of the N-dimensional image data from results of (i) and (ii) performed by said one or more FPGAs on each of said plurality of 2-dimensional image data.

Advantageous Effects of Invention

According to one or more aspects of the present invention, edge artifacts, which would otherwise be generated in 2D FFT, are efficiently and effectively removed. In particular, in some embodiments, access to external access and the 1D DFT processes for 2D DFT are significantly reduced as compared with conventional techniques while effectively removing edge artifacts. For example, in a working example of the present invention, the number of required 1D FFT invocations is decreased, and the external DRAM utilization is reduced significantly, which conserve computational resources significantly.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It is to be understood that both the foregoing general description and the following detailed description are exemplary and explanatory, and are intended to provide further explanation of the invention as claimed.

BRIEF DESCRIPTION OF DRAWINGS

FIG. 1 shows an image before and after processing, and respective Fourier component distributions according to an embodiment of the present invention, which is applied to an exemplary image with non-periodic boundary. 1a) is an exemplary image with non-periodic boundary. 1b) shows 2D DFT of the image of 1a). 1c) is DFT of the smooth component, i.e., the removed artifacts from the image of 1a). 1d) is the periodic component, i.e., DFT of the image of 1a) with edge artifacts removed. 1e) shows a reconstructed image from the smooth component. 1f) shows a reconstructed image from the periodic component.

FIG. 2 is graphs showing the number of DRAM access and the number of DFT points to be computed, respectively, with increasing image size for Mirroring, Periodic Plus Smooth Decomposition (PSD), and the Improved Periodic Plus Smooth Decomposition (OPSD) according to an embodiment of the present invention.

FIG. 3 is the block diagram of a PXIe based multi-FPGA system with a host PC controller connected through a high-speed bus on a PXIe chassis according to an embodiment of the present invention.

FIG. 4 is the block diagram of 2D FFT with ILUT showing data transfer between external memory and local memory scheduled via a Control Unit (CU) according to an embodiment of the present invention.

FIG. 5 is the functional block diagram of PXIe based 2D FFT implementation with simultaneous edge artifact removal using improved periodic plus smooth decomposition according to an embodiment of the present invention.

FIG. 6 shows an overall hardware design flow according to an embodiment of the present invention. DFTs are implemented using standard VHDL Blocks, Flip Function and Math Function. The Flip Function and the Math Function are depicted in detail in FIG. 7 and FIG. 8, Display A and Display B show the original and improved DFT, respectively, and may be displayed on a single or dual display devices.

FIG. 7 shows the Flip Function. The edges of the image are stored in vectors, which are then subtracted and correspondingly flipped.

FIG. 8 shows the Math Function. Cosine has been implemented using standard CORDIC.

FIG. 9 shows an original image, its DFT, the calculated removed component (RC), and DFT-RC, respectively for that image.

DESCRIPTION OF EMBODIMENTS

An ideal method for removing these artifacts discussed above should involve making the image periodic while removing minimum amount of information form the image. The present disclosure uses an efficient periodic plus smooth ("P+S") decomposition (PSD) based approach for this purpose. The PSD, which was first presented by Moisan (NPL No. 11) and used in NPL Nos. 12, 13, and 14, is an ideal method for removing edge artifacts because it does not directly intervene with pixels besides those of the boundary and does not involve increasing the size of the image. Moreover, it is inherently parallel in nature, which makes it ideal for a high-throughput FPGA based implementation. The present inventors have significantly improved the original P+S decomposition algorithm to make the overall implementation much more efficient. In particular, the number of required 1D FFT invocations and the external DRAM utilization are both significantly reduced.

In this disclosure, for rapid-prototyping of the algorithms, the present inventors used National Instruments LabView FPGA 2014 (NPL No. 15), which is a robust data-flow based graphical design environment (NPL No. 16). LabView FPGA provides integration with National Instruments (NI) Xilinx based reconfigurable hardware, allowing efficient communication with a host PC and high-throughput communication between multiple FPGAs through a PXIe bus (PCI eXtentions for Industry Express) (NPL No. 17). LabView FPGA also enables us to integrate external Hardware Description Language (HDL) code and gives us the flexibility to expand the disclosed design for future processing stages. The present inventors used a NI PXIe7976R (NPL No. 18) board, which has a Xilinx Kintex 7 FPGA and 2 GB high-bandwidth external memory. However, the improvement and designs presented in this disclosure are scalable to any reconfigurable computing based system.

This disclosure is organized as follows: the next section I describes edge artifact removal using periodic plus smooth decomposition. Then, section II describes an improvement for P+S decomposition, which leads to reduced number of FFT invocations and less access to external memory, according to an embodiment of the present invention. Section IIIA describes the hardware set-up and section IIIB describes an embodiment of architecture for the improved P+S decomposition in context of the hardware used and how it can be generalized for further processing stages and various applications as well as experimental results.

<I. Periodic Plus Smooth Decomposition for Edge Artifact Removal>

Periodic plus smooth decomposition (PSD) involves decomposing an image into periodic and smooth components; the smooth component is calculated from the boundary of the image and is then subtracted from the image to get the periodic component. Let us have discrete n by m gray-scale image I on a finite domain $\Omega=\{0, 1, \ldots, n-1\} \times \{0, 1, \ldots, m-1\}$. The discrete Fourier transform (DFT) of I is defined as $$\hat{I}(s, t) = \sum_{(i,j) \in \Omega} I(i, j) \exp\left(-i2\pi\left(\frac{si}{n} + \frac{tj}{m}\right)\right) \quad (1)$$

This is equivalent to a matrix multiplication WIV, where $$W = \begin{pmatrix} 1 & 1 & 1 & \ldots & 1 \\ 1 & w & w^2 & \ldots & w^{n-1} \\ 1 & w^2 & w^4 & \ldots & w^{2(n-1)} \\ \ldots & \ldots & \ldots & \ldots & \ldots \\ 1 & w^{n-2} & w^{2(n-2)} & \ldots & w^{(n-2)(n-1)} \\ 1 & w^{n-1} & w^{2(n-1)} & \ldots & w^{(n-1)(n-1)} \end{pmatrix} \text{ and} \quad (2)$$

$$w^k = \exp\left(-i\frac{2\pi}{n}\right)^k = \exp\left(-i\frac{2\pi k}{n}\right). \quad (3)$$

V has the same structure as W but is m-dimensional. Since wk has period n which means that wk=wk+ln, $\forall k, l \in N$ and therefore, $$W = \begin{pmatrix} 1 & 1 & 1 & \ldots & 1 & 1 \\ 1 & w & w^2 & \ldots & w^{n-2} & w^{n-1} \\ 1 & w^2 & w^4 & \ldots & w^{n-4} & w^{n-2} \\ \ldots & \ldots & \ldots & \ldots & \ldots & \ldots \\ 1 & w^{n-2} & w^{n-4} & \ldots & w^4 & w^2 \\ 1 & w^{n-1} & w^{n-2} & \ldots & w^2 & w^1 \end{pmatrix} \quad (4)$$

Since in general, I is not (n, m)-periodic, there will be high amplitude edge artifacts present in the DFT stemming from sharp discontinuities between the opposing edges of the image as shown in b) in FIG. 1. Moisan (NPL No. 11) proposed a decomposition of I into a periodic component P, that is periodic and captures the essence of the image with all high frequency details, and a smoothly varying background S, that recreates the discontinuities at the borders. So, I=P+S. Periodic plus smooth decomposition can be computed by first constructing a border image B=R+C, where R represents the boundary discontinuities when transitioning row-wise and C represents the boundary discontinuities when going column-wise.

$$R(i, j) = \begin{cases} I(n-1-i, j) - I(i, j), & i = 0 \text{ or } i = n-1 \\ 0, & \text{otherwise} \end{cases} \quad (5)$$

$$C(i, j) = \begin{cases} I(i, m-1-j) - I(i, j), & j = 0 \text{ or } j = m-1 \\ 0, & \text{otherwise} \end{cases}$$

It can be seen that the structure of the border image B is simple with nonzero values only in the edges as shown below.

$$B = R + C = \begin{pmatrix} b_{11} & b_{12} & \ldots & b_{1,m-1} & b_{1m} \\ b_{21} & 0 & \ldots & 0 & -b_{21} \\ \ldots & \ldots & \ldots & \ldots & \ldots \\ b_{n-1,1} & 0 & \ldots & 0 & -b_{n-1,1} \\ b_{n1} & -b_{12} & \ldots & -b_{1,m-1} & -b_{nm} \end{pmatrix}. \quad (6)$$

The DFT of the smooth component S can be then found by the following formula.

$$\hat{S}(s, t) = \frac{\hat{B}(s, t)}{2\cos\frac{2\pi s}{n} + 2\cos\frac{2\pi t}{m} - 4}, \forall (s, t) \in \Omega \setminus \{(0, 0)\} \quad (7)$$

The DFT of the image I with the edge artifacts removed is then $$\hat{P} = \hat{I} - \hat{S}.$$

FIG. 1 shows an image I before and after processing, and respective Fourier component distributions according to an embodiment of the present invention, which is applied to an exemplary image with non-periodic boundary. More specifically, 1a) is the image I with non-periodic boundary. 1b) shows 2D DFT of the image of 1a). 1c) is DFT of the smooth component, i.e., the removed artifacts from the image of 1a). 1d) is the periodic component, i.e., DFT of the image of 1a) with edge artifacts removed. 1e) shows a reconstructed image from the smooth component. 1f) shows a reconstructed image from the periodic component.

As shown in the figures, on reconstruction, it is evident that there is negligible visual difference between the actual image of a) and the periodic reconstructed image f). Algorithm 1 below summarizes the overall P+S implementation. There are several ways of arranging the algorithm. In the present disclosure, it is arranged so that the DFTs of the periodic and smooth components are readily available for further processing stages. For best results, both the periodic and smooth components should undergo similar processing stages and should be added back together before displaying the result. However, depending on applications, the smooth component may be discarded altogether.

| Algorithm 1 Periodic Plus Smooth Decomposition (PSD) |
| --- |
| Input: I(i, j) of size n × m |
| Output: P̂(s, t) Ŝ(s, t) |
|     Step A: Compute the 2D DFT of image I(i, j): |
| 1:    I(i, j) $\xrightarrow{\mathcal{F}}$ Î(s, t) |
|     Step B: Compute periodic border B: |
| 2:    if (i = 0 ∨ i = n − 1) then |
| 3:        R(i, j) ← I(n − 1 − i, j) − I(i, j) |
| 4:    else |
| 5:        R(i, j) ← 0 |
| 6:    end if |
| 7:    if (j = 0 ∨ j = m − 1) then |
| 8:        C(i, j) ← I(i, m − 1 − j) − I(i, j) |
| 9:    else |
| 10:       C(i, j) ← 0 |
| 11:   end if |
| 12:   B ← R + C |
|     Step C: Compute the 2D DFT of B̂(s, t): |
| 13:   B(i, j) $\xrightarrow{\mathcal{F}}$ B̂(s, t) |
|     Step D: Compute the Smooth Component Ŝ(s, t): |
| 14:   D̂(s, t) ← $2\cos\frac{2\pi s}{n} + 2\cos\frac{2\pi t}{m} - 4$ |
| 15:   Ŝ(s, t) ← B̂(s, t) ÷ D̂(s, t) |
|     Step E: Compute the Periodic Component P̂(s, t): |
| 16:   P̂(s, t) ← Î(s, t) − Ŝ(s, t) |
| 17:   return P̂(s, t) Ŝ(s, t) |

<II. PSD Improvement for FPGA Implementation>

The present disclosure provides a significant improvement of the original P+S algorithm so that it can be effectively configured on an FPGA. As explained below, as a result of this unique improvement provided in this disclosure, the number of 1D FFT invocations and the utilization of the external DRAM are significantly reduced. Algorithm 1 above indicates that two 2D FFTs need to be computed for each image frame (i.e., for the original image I and the boundary image B). Although, these FFTs may be computed in parallel, they will require a significant amount of 1D FFT invocations and repeated access to the external memory.

On inspecting equation (6) above, the present inventors have realized that the boundary image B is symmetrical in the sense that the boundary rows and columns are an algebraic negation of each other. In total, B has n+m−1 unique elements, with the following relations between the corners with respect to columns and rows.

$$b_{11} = r_{11} + c_{11}$$

$$b_{1m} = r_{1m} + c_{11}$$

$$b_{n1} = -r_{11} + c_{n1}$$

$$b_{nm} = -r_{1m} - c_{n1} \quad (8)$$

$$\Rightarrow b_{nm} = -b_{11} - b_{1m} - b_{n1} \quad (9)$$

In computing the FFT of B, one normally proceeds by first running 1D FFTs column-by-column and then 1D FFT's row-by-row or vice versa. An FFT of a column vector v with length n is W v, where W is given in eq. (4). The column-wise FFT of the matrix B is then given as follows.

$$\hat{B} = WB. \quad (10)$$

With respect to the first column, denoted by $B_{\cdot 1}$, the 1D FFT of this vector is as follows.

$$\hat{B}_{\cdot 1} = WB_{\cdot 1} = \begin{pmatrix} 1 & 1 & \cdots & 1 \\ 1 & w & \cdots & w^{n-1} \\ 1 & w^2 & \cdots & w^{2(n-1)} \\ \cdots & \cdots & \cdots & \cdots \\ 1 & w^{n-2} & \cdots & w^{(n-2)(n-1)} \\ 1 & w^{n-1} & \cdots & w^{(n-1)(n-1)} \end{pmatrix} \begin{pmatrix} b_{11} \\ b_{21} \\ b_{31} \\ \cdots \\ b_{n-1,1} \\ b_{n1} \end{pmatrix} \quad (11)$$

$$= \begin{pmatrix} \sum_{i=1}^{n} b_{i1} \\ \sum_{i=1}^{n} b_{i1} w^{i-1} \\ \sum_{i=1}^{n} b_{i1} w^{2(i-1)} \\ \cdots \\ \sum_{i=1}^{n} b_{i1} w^{(n-2)(i-1)} \\ \sum_{i=1}^{n} b_{i1} w^{(n-1)(i-1)} \end{pmatrix}$$

It can be shown that the 1D FFT of the column j ∈ {2, 3, . . . , n−1} is as follows.

$$\hat{B}_{\cdot j} = WB_{\cdot j} = \begin{pmatrix} 1 & 1 & \cdots & 1 \\ 1 & w & \cdots & w^{n-1} \\ 1 & w^2 & \cdots & w^{2(n-1)} \\ \cdots & \cdots & \cdots & \cdots \\ 1 & w^{n-2} & \cdots & w^{(n-2)(n-1)} \\ 1 & w^{n-1} & \cdots & w^{(n-1)(n-1)} \end{pmatrix} \begin{pmatrix} b_{1j} \\ 0 \\ 0 \\ \cdots \\ 0 \\ -b_{1j} \end{pmatrix} \quad (12)$$

$$= b_{1j} \begin{pmatrix} 0 \\ 1 - w^{n-1} \\ 1 - w^{n-2} \\ \cdots \\ 1 - w^2 \\ 1 - w \end{pmatrix} = b_{1j} v,$$

The 1D FFT of the last column $B_{\cdot m}$ is as follows.

$$\hat{B}_{\cdot m} = W B_{\cdot m} \quad (13)$$

$$= \begin{pmatrix} -\sum_{i=1}^{n} b_{i1} \\ -\sum_{i=1}^{n} b_{i1} w^{j-1} + (b_{11} + b_{1m})(1 - w^{n-1}) \\ -\sum_{i=1}^{n} b_{i1} w^{2(i-1)} + (b_{11} + b_{1m})(1 - w^{2(n-1)}) \\ \vdots \\ -\sum_{i=1}^{n} b_{i1} w^{(n-2)(i-1)} + (b_{11} + b_{1m})(1 - w^{(n-2)(n-1)}) \\ -\sum_{i=1}^{n} b_{i1} w^{(n-1)(i-1)} + (b_{11} + b_{1m})(1 - w^{(n-1)(n-1)}) \end{pmatrix} \quad (14)$$

$$\hat{B}_{\cdot m} = -\hat{B}_{\cdot 1} + (b_{11} + b_{1m}) v \quad (15)$$

So, the column-wise FFT of the matrix B is as follows.

$$\hat{B} = (\hat{B}_{\cdot 1}, b_{12} v \ldots + b_{1,n-1} v - \hat{B}_{\cdot 1} + (b_{11} + b_{1m}) v) \quad (16)$$

To compute the column-by-column 1D FFT of the matrix B, we only need to compute the FFT of the first vector and then use the appropriately scaled vector v to derive the FFT for the rest of the columns. The row-by-row FFT has to be calculated normally. Algorithm 2 presents a summary of the shortcut for calculating $$\hat{B}(s,t).$$

The steps presented in Algorithm 2 replaces step 13 of Algorithm 1. By reducing the column-by-column 1D FFT computations for the boundary image, this method can significantly reduce the number of 1D FFT invocations and reduce DRAM access for an FPGA-based implementation. This can be implemented by temporarily storing the initial vector $$\hat{B}_{\cdot 1}$$

and scaling factors $b_{1j}$ in the block RAM/register memory, drastically reducing the DRAM access and lowering the number of required 1D FFT invocations.

---

Algorithm 2 Proposed Symmetrically Optimized Computation of $\hat{B}(s,t)$

Input: $B(i, j)$ of size $n \times m$
Output: $\hat{B}(s, t)$ $2D \mathscr{F}(B) \Leftrightarrow B \xrightarrow{\mathscr{F}_{cw}} \hat{B}_{cw} \xrightarrow{\mathscr{F}_{rw}} \hat{B}$
Column-by-Column DFT via Symmetrical Short-cut:
1: $B_{\cdot 1} \xrightarrow{\mathscr{F}} \hat{B}_{\cdot 1}$
2: while $1 < j < m$ do
3:   $\hat{B}_{\cdot j} \leftarrow b_{1j} v$
4: end while
5: $\hat{B}_{\cdot m} \leftarrow -\hat{B}_{\cdot 1} + (b_{11} + b_{1m})$
6: $\hat{B}_{cw} \leftarrow$ Concatenate $\hat{B}_{\cdot 1} \hat{B}_{\cdot 2} \ldots \hat{B}_{\cdot m-1} \hat{B}_{\cdot m}$
Row-by-Row DFT:
7: $\hat{B}_{cw} \xrightarrow{\mathscr{F}_{rw}} \hat{B}(s, t)$
8: return $\hat{B}(s, t)$
  cw: column-wise/column-by-column
  rw: row-wise/row-by-row

---

For an N×M image, the above-described technique can reduce the DRAM access from 4NM points to 3NM+N+M−1 points and reduce the number of 1D FFT invocations to 1 column vector rather than M column vectors while calculating the column-by-column component of the 2D FFT. In other words, the number of DFT points to be computed can be reduced from 4NM to 3NM+M. Table I shows a comparison of Mirroring, P+S Decomposition (PSD), and the present embodiment of the Improved P+S Decomposition (OPSD) with respect to DRAM access points (read) and DFT points. Mirroring has been used for comparison purposes because it is one of the alternative techniques, which removes edge artifacts while maintaining maximum amplitude information. However, due to replication of the image, most of the phase information is lost.

FIG. 2 is graphs showing the number of DRAM access and the number of DFT points to be computed, respectively, with increasing image size for Mirroring, Periodic Plus Smooth Decomposition (PSD), and the Improved Period Plus Smooth Decomposition (OPSD) according to an embodiment of the present invention. As shown in FIG. 2, the improved PSD method according to the embodiment of the present invention can significantly reduce the reading from the external memory as well as reduce the overall number of DFT computations required, as compared with conventional Mirroring and PDS.

TABLE I

COMPARING MIRRORING, PSD, AND OPSD

| Algorithm | DRAM Access Points | DFT Points |
|---|---|---|
| Mirroring | 8NM | 8NM |
| P + S Decomposition (PSD) | 4NM | 4NM |
| Improved PSD (This Invention) | 3NM + N + M − 1 | 3NM + M |

<III. FPGA Implementation of Improved PSD>
<A. Hardware Setup>

Since 2D DFTs are usually used for simplifying convolution operations in complex image processing and machine vision systems, the present inventors have prototyped the design on a system which is expandable for next levels of processing, as a working example of the present invention. FIG. 3 is the block diagram of a PXIe based multi-FPGA system with a host PC controller connected through a high-speed bus on a PXIe chassis according to an embodiment of the present invention. For rapid-prototyping of the proposed improved periodic plus smooth decomposition algorithm according to an embodiment of the present invention, a PXIe (PCI eXtentions for Industry express) based reconfigurable system was used. PXIe is an industrial extension of a PCI system with an enhanced bus structure, which gives each connected device a dedicated access to the bus with a maximum throughput of 4 GB/s. This allows a high speed dedicated link between a host PC and several FPGAs. LabView FPGA graphical design environment can be used for rapid-prototyping of complicated signal and image processing systems. It allows us to effectively integrate external HDL code and LabView graphical design on a single platform. In making the working example, the present inventors used a FlexRIO (Flexible Reconfigurable I/O) FPGA board, which was plugged into a PXIe chassis. PXIe FlexRIO FPGA boards are flexible and can be used to achieve high-throughput because they allow direct data transfer between multiple FPGAs at rates as high as 1.5 GB/s. This can significantly simplify multi-FPGA systems which usually communicate via a host PC. This feature allows expansion of our system to further processing stages making it flexible for a variety of applications. FIG. 3 shows a basic overview of a PXIe based multi-FPGA system with a host PC controller connected through a high-speed bus on a PXIe chassis. A NI PXIe-7976R FlexRIO board, which has a Kintex 7 FPGA and 2 GB external DRAM with data bandwidth up to 10 GB/s, was used. This FPGA board was plugged into a PXIe-1082 chassis along with a PXIe-8135 Core i7 PC controller.

<B. Basic Architecture>

As per Algorithm 1 and 2 discussed above, the implementation of the present embodiment can be broken down into four stages: 1) calculating the 2D FFT of an image frame; 2) calculating the Boundary Image; 3) calculating the 2D FFT of the Boundary image and calculating the smooth component; and 4) subtracting the smooth component from the 2D FFT of the original image to derive the periodic component. Among all the steps, the bottleneck will lie at the 2D FFT computations.

Most 2D FFT implementations on FPGAs use row and column decomposition (RCD) with intermediate external DRAM storage. Acceleration of RCD-based 2D FFTs is usually dependent on the throughput of the 1D FFT used for column-by-column and row-by-row 1D FFT computations. This RCD for a N×M image requires computation of N row-wise and M column-wise 1D FFTs. Which means that MN (or $N^2$ if M=N) values must be stored after the first (row or column)-wise computations. Since 2D FFTs are usually calculated for large images, which cannot be stored on the limited embedded block RAM, external memories must be used. Hence, the acceleration also depends on bandwidth and efficient addressing of the external memory. For small size images, a block RAM or memory implemented via registers may be used (NPL No. 19) as opposed to the external memory. A register memory is usually faster and easier to use, because, unlike the external memory, it does not have limitations in terms of number of available channels and bandwidth. However, such an approach is resource expensive and leads to the consumption of a hefty amount of FPGA resources if the image is large. Uzun (NPL No. 7) presented an architecture for real-time 2D FFT computations using several 1D FFT processors with shared external RAM.

For a 2D FFT implementation according to an embodiment of the present invention, the present inventors also used an approach based on RCD with multi-core 1D FFTs. For the 1D FFT implementation, the present inventors used an Inner Loop Unrolling Technique (ILUT) first presented by Hojin (NPL No. 20) and has also used in a 2D FFT setting (NPL No. 2). A 1D FFT of length N has log N FFT stages and each stage has N/2 butterfly units. ILUT involves unrolling a single FFT stage by executing several butterfly units in parallel (NPL No. 2). FIG. 4 shows a block diagram of 2D DFT with ILUTs, showing data transfer between external memory and local memory scheduled via a Control Unit (CU) according to an embodiment of the present invention. The data between the camera and the FPGA is transferred via the PC controller by using DMA (Direct Memory Access) FIFO. However, it is also possible to directly transfer data to the FPGA by using a camera-link front-end. Local memory shown in FIG. 4 is used to buffer data between the external memory and the 1D FFT cores. This local memory is divided into read-and-write components and is implemented using FPGA slices. This saves the block RAM (BRAM) for temporary storage of vectors required for calculating the 2D FFT of the boundary image. The Control Unit (CU) organizes scheduling of transferring data between the local and external memory.

The 2D FFT of the boundary image also needs to be calculated by row and column decomposition. However, as shown mathematically above, the initial row-wise FFTs can be calculated by computing the 1D FFT of the first (boundary) vector, and the FFTs of the reaming vectors can be computed by appropriate scaling of this vector. The boundary image is calculated in the PC controller. But this entire image does not need to be transferred to the FPGA. We need the boundary column vector for 1D FFT calculation of the first column and the last column. We also need the boundary row vector for appropriate scaling of $\hat{v}$ for the 1D FFT of every column in-between the first column and the last column. To minimize the data transfer between the host and the FPGA, the present embodiment associates an extra row and a column vector at the end of each image frame being transferred via DMA FIFO. So when transferring an N×M image frame, the amount of data points sent from the PC controller are NM+N+M.

The row and column vectors of the boundary image are stored in the block RAM (BRAM) while the image frame is directly stored into the external DRAM. This allows for the column-by-column 1D FFT calculations of the boundary image to be proceed in parallel with the FFT computations of the actual image. A control unit schedules all read-write operations between the external and local memories. FIG. 5 shows a functional block diagram of the overall 2D FFT with the improved PSD process according to the embodiment of the present invention as described above. More specifically, it shows a functional block diagram of PXIe based 2D FFT implementation with simultaneous edge artifact removal using improved periodic plus smooth decomposition according to the embodiment of the present invention described above. The subtraction of the two images takes place in the host PC to minimize memory clashes and to access the periodic and smooth component of each frame as it becomes available.

Conventional RCD based 2D FFT hardware implementations do not use periodic plus smooth decomposition to simultaneously remove edge artifacts. The embodiment of the present inventions effectively performs double the amount of 1D FFT computations (for the original and boundary image) for each image frame, but requires only a fraction of higher run time as compared with the conventional implementations that do not perform simultaneous edge artifacts removal. As demonstrated above, this acceleration has been achieved by parallelization of 2D FFT calculations for the original and boundary image and by reducing the external DRAM access by improving the original periodic plus smooth decomposition algorithm.

As described above, the present disclosure provides an improved FPGA-based scheme for calculating high-throughput 2D DFTs with simultaneous edge artifact removal. It is based on a periodic plus smooth decomposition algorithm, which splits the frequency domain of a 2D image into a smooth component that has the high-frequency cross-shaped artifacts and can be subtracted from the 2D DFT of the original image to obtain a periodic component which is artifact free. Since this approach involves calculating two 2D DFTs simultaneously, external memory addressing and repeated 1D FFT invocations could become a problem. To solve this problem, as described above, the present disclosure provides a scheme to improve the original PSD algorithm, which can reduce the number of DFT samples to be computed and the DRAM access by as much as 24%. The technique according to embodiments of the present invention were tested using extensive synthesis and benchmarking using a Xilinx Kintex 7 FPGA communicating with a host PC on a high-speed PXIe bus. The disclosed system is expandable to support several FPGAs communicating over a high-speed bus and can be ideal for large scale computer vision and biomedical applications. Despite decomposing the image into periodic and smooth frequency components, the design according to embodiments of the present invention only requires a slightly higher run-time as compared to traditional FPGA based 2D DFT implementations, and can be used for a variety of real-time applications.

Additional Details and Other Modifications of Embodiments of the Present Invention Some additional details and other possible modifications of the embodiments of the present invention, some of which have been already described above, are provided below.

Some embodiments of the preset invention were created using LabView 2014 and were tested using LabView FPGA module 2014. The FPGA device used was Xilinx Vertix 5; however, the design is scalable to any FPGA module.

Image acquisition was done using National Instruments (NI) Vision Acquisition Software, IMAQ Vision. The image was loaded from a file, but can potentially be loaded from a camera or any image acquisition device as long as it supports IMAQ protocol.

Power over Camera Link (PoCL), which is an alternative image acquisition software, may also be used as an image acquisition protocol.

Discrete Fourier Transform (DFT) function used in the embodiments of the present invention is from National Instruments, and has been provided in LabView 2014. However, it may be replaced by any DFT Intellectual Property (IP) Block to make the overall design faster.

FIG. 6 shows an overall hardware design flow according to an embodiment of the present invention. DFTs are implemented using standard VHDL Blocks, Flip Function and Math Function. Display A and Display B show the original and improved DFT, respectively, and may be displayed on a single or dual display devices.

The flow diagram for the Flip Function is shown in FIG. 7. Array index, subtract and replace array subset functions are used to flip positions, as mentioned in NPL No. 11, directly in a cache memory in order to reduce overall time required for memory exchange.

Math Function shown in FIG. 8 calculates the necessary mathematical functions (including division, multiply, subtraction and cosine) and requires the output of the Fourier transformed flip function as an input.

Cosine in the Math function may be calculated using CORDIC (Coordinate Rotation Digital Computer) Algorithms or based on a LUT (Look Up Table).

It must be noted that the dotted region in FIG. 6 represents parallel operation. The DFT is being calculated in parallel with DFT of the flip function followed by the math function.

FIG. 9 shows an original image, its DFT, the calculated removed component (RC), and DFT-RC, respectively for that image according to the present embodiment.

This embodiment of the present invention was for an image size of 512×512, but can be scaled to any rectangular size. IMAQ displays are used to display the result on a screen.

Comparing to a general purpose processor (GPP) of 3 GHz, the disclosed scheme could potentially calculate the improved FFT in less than 1.5 clock cycles. However, this figure depends on the type of FPGA used and the clock cycles selected.

The present disclosure provided a novel FPGA-based design to calculate high-throughput 2D DFTs with simultaneous edge artifact removal. Standard approaches for removing these artifacts using apodization functions or mirroring, either involve removing critical frequencies or a surge in computation by increasing image size. The present disclosure uses a periodic-plus-smooth decomposition based artifact removal algorithm improved for FPGA implementation, while still achieving real-time (i.e., equal to or greater than 23 frames per second) performance for a 512×512 size image stream. The approach disclosed herein leads to a significant decrease in external memory utilization, thereby avoiding memory conflicts and simplifies the design. Embodiments of the present invention were demonstrated using a PXIe based Xilinx Kintex 7 FPGA system communicating with a host PC, which gives us the advantage to further expand the disclosed scheme for various industrial applications.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

The invention claimed is:

1. A method for performing 2-dimensional discrete Fourier transform of a subject image data to be performed in one or more digital processors, the method comprising:
   step (a) of extracting boundary image data from the subject image data;
   step (b) of performing 2-dimensional fast Fourier transform of the subject image data by performing 1-dimensional fast Fourier transform on each row of the subject image data and performing 1-dimensional fast Fourier transform on each column of the subject image data;
   step (c) of performing a simplified 2-dimensional fast Fourier transform processing on the extracted boundary image data without performing column-by-column 1-dimensional fast Fourier transform so as to derive fast Fourier transform of a smooth component, the step (c) including:
   performing 1-dimensional fast Fourier transform only on a first column vector in the extracted boundary image data,
   using scaled column vectors to derive fast Fourier transform of remaining columns of the extracted boundary image data, and
   performing 1-dimensional fast Fourier transform on each row of the extracted boundary image data; and
   step (d) of deriving fast Fourier transform of a periodic component of the subject image data with edge-artifacts removed by subtracting the fast Fourier transform of the smooth component derived in step (c) from the 2-dimensional fast Fourier transform of the subject image data performed by step (b).

2. The method according to claim 1, wherein steps (b) and (c) are processed in parallel.

3. The method according to claim 1,
   wherein said one or more processors include a host computer and one or more Field Programmable Gate Arrays (FPGAs) connected to the host computer, and
   wherein steps (a) and (d) are performed by the host computer, and steps (b) and (c) are performed in parallel by one or more FPGAs.

4. A method for performing N-dimensional fast Fourier transform of an N-dimensional image data, where N is an integer greater than 2, the method comprising:
   slicing said N-dimensional image data into a plurality of 2-dimensional image data; and
   performing the method for performing 2-dimensional discrete Fourier transform of a subject image data as set forth in claim 1 on each of said plurality of 2-dimensional image data; and
   deriving the N-dimensional fast Fourier transform of said N-dimensional image data from results of performing the method of claim 1 on each of said plurality of 2-dimensional image data.

5. A system for performing 2-dimensional discrete Fourier transform of a subject image data, comprising:
   a host computer; and
   one or more Field Programmable Gate Arrays (FPGAs) connected to the host computer by a bus,
   wherein the host computer extracts boundary image data from the subject image data,
   wherein said one or more FPGAs perform (i) 2-dimensional fast Fourier transform of the subject image data by performing 1-dimensional fast Fourier transform on each row of the subject image data and performing 1-dimensional fast Fourier transform on each column of the subject image data,
   wherein said one or more FPGAs perform (ii) a simplified 2-dimensional fast Fourier transform processing on the extracted boundary image data without performing column-by-column 1-dimensional fast Fourier transform so as to derive fast Fourier transform of a smooth component, the processing including:
      performing 1-dimensional fast Fourier transform only on a first column vector in the extracted boundary image data,
      using scaled column vectors to derive fast Fourier transform of remaining columns of the extracted boundary image data, and
      performing 1-dimensional fast Fourier transform on each row of the extracted boundary image data, and
   wherein the host computer derives fast Fourier transform of a periodic component of the subject image data with edge-artifacts removed by subtracting the derived fast Fourier transform of the smooth component from the performed 2-dimensional fast Fourier transform of the subject image data.

6. The system according to claim 5, wherein the host computer controls said one or more FPGAs such that (i) and (ii) are processed in parallel.

7. The system according to claim 6,
   wherein the host computer is further configured to receive an N-dimensional image data, where N is an integer greater than 2, and slice said received N-dimensional image data into a plurality of 2-dimensional image data,
   wherein said one or more FPGAs perform (i) and (ii) on each of said plurality of 2-dimensional image data, and
   wherein the host computer derives N-dimensional Fourier transform of the N-dimensional image data from results of (i) and (ii) performed by said one or more FPGAs on each of said plurality of 2-dimensional image data.

* * * * *